United States Patent
Ho et al.

(10) Patent No.: US 9,047,259 B1
(45) Date of Patent: Jun. 2, 2015

(54) SYSTEM AND METHOD FOR RENAMING HYPERLINKS

(75) Inventors: Casey Ho, Burnaby (CA); Joanne L. McKinley, Waterloo (CA)

(73) Assignee: Google Inc., Mountain View, CA (US)

( * ) Notice: Subject to any disclaimer, the term of this patent is extended or adjusted under 35 U.S.C. 154(b) by 327 days.

(21) Appl. No.: 12/840,760

(22) Filed: Jul. 21, 2010

(51) Int. Cl.
*G06F 17/00* (2006.01)
*G06F 17/22* (2006.01)
*G06F 17/30* (2006.01)
*G06F 17/24* (2006.01)

(52) U.S. Cl.
CPC ...... *G06F 17/2235* (2013.01); *G06F 17/30014* (2013.01); *G06F 17/30882* (2013.01); *G06F 17/3089* (2013.01); *G06F 17/30864* (2013.01); *G06F 17/24* (2013.01)

(58) Field of Classification Search
CPC .......... G06F 17/30014; G06F 17/2235; G06F 17/30882; G06F 17/3089; G06F 17/24; G06F 17/3011; G06F 17/30864; A01B 12/006
USPC ........................... 715/200–210; 709/217, 245
See application file for complete search history.

(56) References Cited

U.S. PATENT DOCUMENTS

| | | | |
|---|---|---|---|
| 2007/0124414 A1* | 5/2007 | Bedingfield et al. | 709/217 |
| 2007/0260705 A1* | 11/2007 | Armstrong et al. | 709/217 |
| 2008/0109712 A1* | 5/2008 | McBrearty et al. | 715/208 |
| 2008/0126400 A1* | 5/2008 | Mitsuishi | 707/102 |
| 2011/0047152 A1* | 2/2011 | Smith, III | 707/723 |
| 2011/0244882 A1* | 10/2011 | Hancock | 455/456.1 |
| 2011/0264992 A1* | 10/2011 | Vishria et al. | 715/208 |
| 2012/0290923 A1* | 11/2012 | Bedingfield et al. | 715/234 |
| 2012/0324327 A1* | 12/2012 | Vishria et al. | 715/208 |
| 2013/0151507 A1* | 6/2013 | Trevor et al. | 707/720 |

* cited by examiner

*Primary Examiner* — Quoc A Tran
(74) *Attorney, Agent, or Firm* — Fish & Richardson P.C.

(57) ABSTRACT

Methods, systems, and apparatus, including computer programs encoded on a computer storage medium, for receiving a first hyperlink as input, the first hyperlink comprising a resource indicator and link text, processing the resource indicator using a computing device to determine substitute link text, generating a second hyperlink, the second hyperlink comprising the resource indicator and the substitute link text, and providing the second hyperlink to be displayed on a display.

16 Claims, 6 Drawing Sheets

SYSTEM AND METHOD FOR RENAMING HYPERLINKS

BACKGROUND

This specification generally relates to Uniform Resource Indicators, such as Uniform Resource Locators, which provide links resources.

Electronic messages, such as emails, instant messages, VoIP audio messages, text messages, facsimile messages, or blog or social network posts include links or other references to resources. For example, a sender of an email may paste a hyperlink that references a particular web resource into the subject line or body of the email. Among several types of data encoded in the hyperlink, a Uniform Resource Identifier (URI) associated with the web resource may be encoded as the link destination.

SUMMARY

According to one innovative aspect of the subject matter described in this disclosure, an application running on a computing device can generate a display name for a web page pointed to by a resource indicator included in a hyperlink. A display device included with the computing device can display the display name to a user, providing the user with meaningful information regarding the resource pointed to by the resource indicator. In addition, the display name can be a hyperlink to the resource pointed to by the resource indicator that maintains the resource indicator as an underlying link. For example, a display device included with the computing device can display the display name for the URI as the hyperlink. The display name can be a simpler, shorter and more accurate text representation of the link provided by the resource indicator. The display name can display more meaningful information regarding the resource to the user than just the display of the original resource indicator. For example, when the user highlights and activates the display name hyperlink, the user will be directed to the resource pointed to by the underlying resource indicator.

In general, another innovative aspect of the subject matter described in this disclosure may be embodied in methods that include the actions of receiving a first hyperlink as input, the first hyperlink comprising a resource indicator and link text, processing the resource indicator using a computing device to determine substitute link text, generating a second hyperlink, the second hyperlink comprising the resource indicator and the substitute link text, and providing the second hyperlink to be displayed on a display.

Other implementations of this aspect include corresponding systems, apparatus, and computer programs, configured to perform the actions of the methods, encoded on computer storage devices.

These and other implementations may each optionally include one or more of the following features. For instance, processing includes analyzing the link text of the first hyperlink, the substitute link text comprising a portion of the link text of the first hyperlink; the substitute link text is further based on a type of resource the resource indicator indicates; the type of resource includes a type from the group consisting of an HTML page, a data file, a server, an image file, a sound file and a video file; processing includes accessing metadata based on the resource indicator, the substitute link text being determined based on the metadata; processing includes examining content provided at a resource that is pointed to by the resource indicator, the substitute link text being determined based on the content; operations further include displaying the first hyperlink on the display, wherein displaying the second hyperlink includes substituting the first hyperlink for the second hyperlink on the display; the operations further include processing an application program interface (API) that is exposed by a resource that the resource indicator indicates for determining the substitute link text; processing an API includes retrieving metadata using the API and at least a portion of the link text, the substitute link text being determined based on the metadata; the operations further include determining a number of characters of the link text, and comparing the number of characters to a threshold number of characters, wherein processing the resource indicator, generating a second hyperlink, the second hyperlink comprising the resource indicator and the substitute link text, and displaying the second hyperlink are only executed when the number of characters exceeds the threshold number of characters; providing a first hyperlink includes retrieving a shortened hyperlink, and processing the shortened hyperlink to determine an address that the shortened hyperlink corresponds to, the first hyperlink comprising the address; the operations further include comparing the address to a directory of addresses, determining that the address corresponds to a malicious resource based on comparing, and displaying an indicator corresponding to the address, the indicator indicating that the address corresponds to a malicious resource; the first hyperlink is provided based on user input to an electronic document; wherein processing includes determining that the link text includes one or more predefined characters, wherein generating a second hyperlink and displaying the second hyperlink are only executed in response to determining that the link text includes one or more predefined characters; wherein processing comprises determining that the link text includes a string of characters comprising a non-sensical term, wherein generating a second hyperlink and displaying the second hyperlink are only executed in response to determining that the link text includes a string of characters comprising a non-sensical term; and wherein processing includes identifying a contact based on the link text, and determining information related to the contact using a contact list, wherein the substitute link text includes the information.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
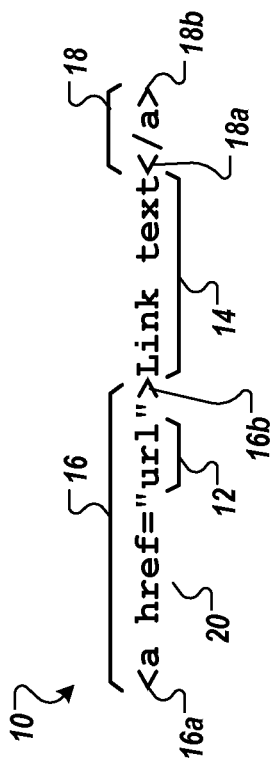
FIG. 1 is a diagram of an exemplary HyperText Markup Language (HTML) element.

A link to a resource can include a Uniform Resource Indicator (URI), such as a Uniform Resource Locator (URL). Although the present disclosure is provided using URLs as an example, the aspects provided herein are equally applicable to URIs in general. A URL can, for example, provide the "address" of a resource. Example resources can include one or more web pages on a website, a data file, a server, an image file, a sound file and/or a video file. For purposes of illustration, the example case of a resource including a web page is provided. In the example case of the resource including a web page, the URL, in effect, points to the web page. The URL can provide information to navigate from a current web page to another web page. A URL can include a string of alphanumeric characters that describe a location and a means for obtaining a resource. The URL can include a path used to find the specified resource that can include a domain name and query parameters used to identify the information sought from the specified resource. A display device included with a computing device can display the URL to a user as a hyperlink, using the URL string as the text displayed to the user for the hyperlink. The display device can be included on a client computing device to display the URL to the user. The user can activate the hyperlink by pointing to and selecting the hyperlink using a pointing device that is included with the computing device.

In some situations, URLs can become long and convoluted as websites add query parameters and additional path components to help organize website content, user logging and logic included in a web application. The URL may not provide meaningful information about the web page to the user. Users can access web pages using a variety of computing devices that include desktop computers with large, easy to read displays and small handheld mobile devices (e.g., PDAs, smartphones, etc.) with smaller displays that provide more limited viewing space. In some cases, a URL can be lengthy, spanning multiple lines on the display device and obscuring relevant information related to the currently displayed web page. Additionally, a URL spanning multiple lines can occupy significant screen space on the limited display size of a small handheld mobile device leaving little or no additional area on the display device for displaying web page content.

In some implementations, an application generating a URL can intelligently provide a shortened text representation of the URL (a shortened URL), while maintaining the original URL as an underlying link associated with the shortened text representation of the URL. The shortened URL can be a display name for the URL that can be displayed to a user in place of the original, more detailed URL. For example, the shortened URL can be displayed to a user on a computing device, such as a client-side computing device in a client-server architecture. The shortened URL can be an informative representation of the link and/or the resource that the link points to. For example, an application can parse the original URL and extract information related to the resource pointed to by the URL. The application can then use the extracted information when creating the shortened URL. Additionally, the application can access an Application Programming Interfaces (API) exposed by a resource the URL points to, as well as examine content at the resource to extract relevant information regarding the resource. This information can be included in the creation of the display name. The display name is anchored to the original URL providing the user with a hyperlink to the resource pointed to by the original URL. The display name provides the user with meaningful information regarding the resource that the user is directed to when selecting the hyperlink, for example, by using a pointing device provided by a computing device.

In some implementations, an application running on a computing device can examine a hyperlink and determine a resource type (e.g., a mapping resource) for the link. The application can examine query parameters in the URL included in the hyperlink and determine which parameters provide meaningful information for display to a user in the form of a display name. The display name can be a shortened version of the original URL. The display name is provided as a hyperlink to the resource pointed to by the original URL as it is anchored to the hyperlink. For example, a hyperlink for a specified location on a map included in a map-hosting web site, for example, can include the address for the location shown on the map along with other information used by the web page to access and display the map. The display name for the hyperlink can include the address for the location shown on the map, as this information is meaningful to the user. The display device can display the display name as a hyperlink in a readily recognized format to the user. The user can use a pointing device included with the computing device to select the hyperlink and navigate to the web page pointed to by the original URL. When hovering over the hyperlink, the display device can display the original URL associated with the hyperlink.

Parsing a hyperlink to determine meaningful user information for generating a display name for the hyperlink can be based on query parameters provided in the original URL. Additionally, the application, when parsing such query parameters, can recognize parameters that can be useful to display to a user (e.g., query parameters displayed in such a way that they provide meaningful information to the user such as the address of a location shown on a map).

In some implementations, an application running on a computing device can examine a hyperlink and determine a resource type (e.g., a video resource) associated with the hyperlink. An application may use this implementation, for example, when the URL includes query parameters that provide little or no meaningful information for display to a user (e.g., an identification number for a resource hosted by a web page). The application can use an API exposed by the identified property to assist in creating a display name. The hyperlink can include a query parameter (e.g., a numerical identifier for a specific video) that when used with the API retrieves metadata about the resource. The application can extract information for display that is meaningful to a user from the metadata (e.g., the title of the video). The application can use the metadata to create a display name for the hyperlink that includes information meaningful to the user. The display name can be shorter in length than the original URL. The display name is provided as a hyperlink to the resource pointed to by the original URL as it is anchored to the hyperlink. For example, the API can use an identification number for a video included in the query parameters of a hyperlink for a video hosting and sharing website. The title of the video, for example, can be retrieved and be used as a display name for a substitute hyperlink. The user can use a pointing device included with the computing device to select the hyperlink to navigate to the resource pointed to by the original URL. When hovering over the hyperlink, the display device can display the original URL associated with the hyperlink.

Using one or more APIs along with one or more query parameters to retrieve metadata about the property assumes the property provides APIs and metadata. Using an API and query parameter to retrieve metadata may include the application parsing the original hyperlink to determine one or more query parameters, accessing the resource pointed to by the original URL, calling the API using a query parameter, retrieving metadata, parsing the metadata to determine information useful to the user, and creating a new hyperlink including a display name that is based on the information.

In some implementations, the creation of a display name can include examining the actual content at the resource pointed to by the hyperlink (e.g., the title of a web page) to determine a meaningful display name. The created display name is provided as part of a new hyperlink to the resource pointed to by the original URL. An application may examine the content of the resource pointed to by the hyperlink if, for example, the underlying URL does not provide information that is readily meaningful to the user. Examining the content of the resource may require the application to access the web page and parse the web page content to determine useful information about the web page to provide to the user in the display name.

FIG. 1 is a diagram of an exemplary HyperText Markup Language (HTML) element 10. HTML is a markup language for web page creation that provides a structured document format for specifying the structural semantics for text displayed on a web page (e.g., headings, paragraphs, lists, quotes, hyperlinks, etc.). In addition, HTML enables embedding of images and objects for display (e.g., for use in interactive forms).

A hyperlink can be a reference (e.g., an address) to a resource (e.g., a web page, an image, a sound file, a movie, etc.). An anchor can define a hyperlink destination inside an HTML document. An HTML document can include one or more elements consisting of tags surrounded by angle brackets. Hypertext markup makes parts of the HTML document into links to other documents. For example, element 10 includes start tag 16 provided between angle brackets 16a, 16b and end tag 18 provided between angle brackets 18a, 18b. A hypertext reference (href) attribute 20 is set to a valid URL 12.

Element 10 can be used to represent an HTML link where the start tag 16 includes attributes about a resource link and link text 14 defines text displayed to a user, which is rendered as a hyperlink. The href attribute 20 defines the link "address" and is set to the URL 12. For example, a display device included in a computing device displays the link text 14 to a user. The link text 14 is rendered as a hyperlink. When the user selects and activates (e.g., clicks on) the hyperlink using a pointing device included in the computing device, the user is directed to the resource pointed to by the URL 12. The use of an anchor can connect or associate the URL 12 to the link text 14.

Figure 2:
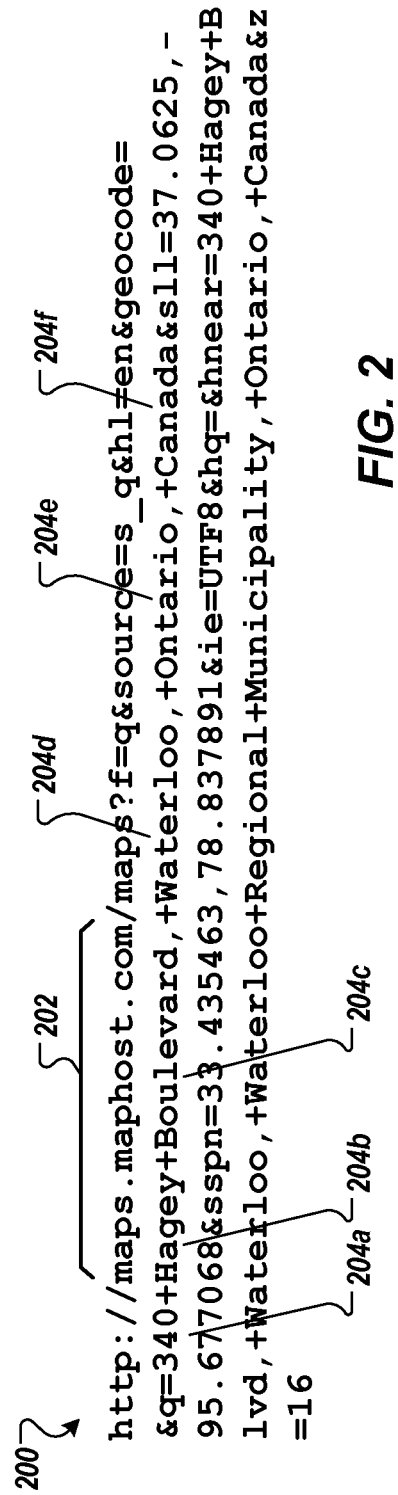
FIG. 2 is an illustration of an example map-hosting website link for an address.

FIG. 2 is an illustration of an example map-hosting website link for an address, map-host URL 200. The map-host URL 200 includes a domain name 202 and query parameters 204. For example, referring to FIG. 1, the map-host URL 200 can be included in element 10 at URL 12. Referring to FIG. 2, the map-host URL 200 may be too large to display on, for example, a screen of a handheld computing device (e.g., some of the map-host URL 200 may be truncated or the map-host URL 200 may cover a large portion of the screen of the computing device). An application running on the handheld computing device can parse the query parameters 204 of the map-host URL 200. The application can determine meaningful information from the map-host URL 200 for use as a substitute display name. The display name is provided as a hyperlink that uses the map-host URL 200 to navigate to a resource. In this example, the resource provides a map, based on the query parameters provided in the original hyperlink, that displays the location of a particular address. The query parameters 204 include information about the location (e.g., house number 204a ("340"), street name 204b ("Hagey") street 204c ("Boulevard"), city 204d ("Waterloo"), province 204e ("Ontario") and country 204f ("Canada")). The application can parse the query parameters 204 and identify parameters 204a-204f for generating a display name for a hyperlink for the map-host URL 200. The generated display name can be included in element 10 as link text 14.

Figure 3:
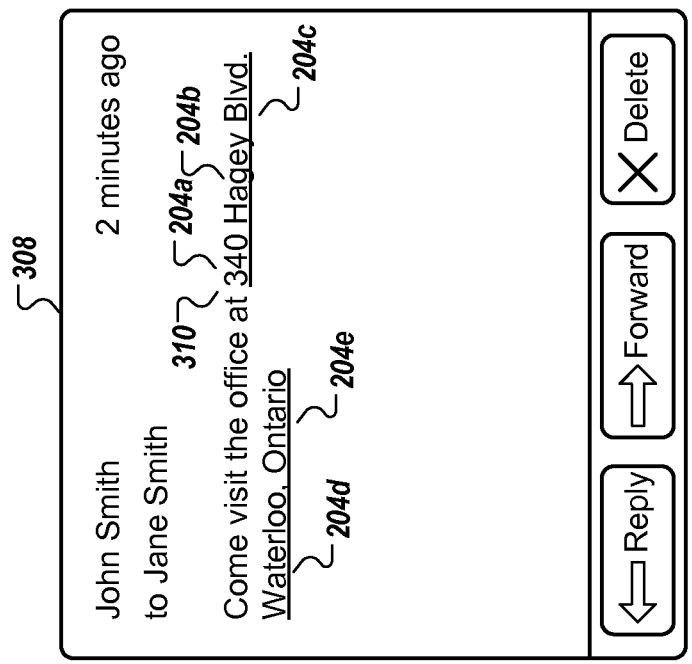
FIG. 3 is an example illustration demonstrating the use of a display name to replace a map-host URL as a hyperlink on a web page.
Figure 3:
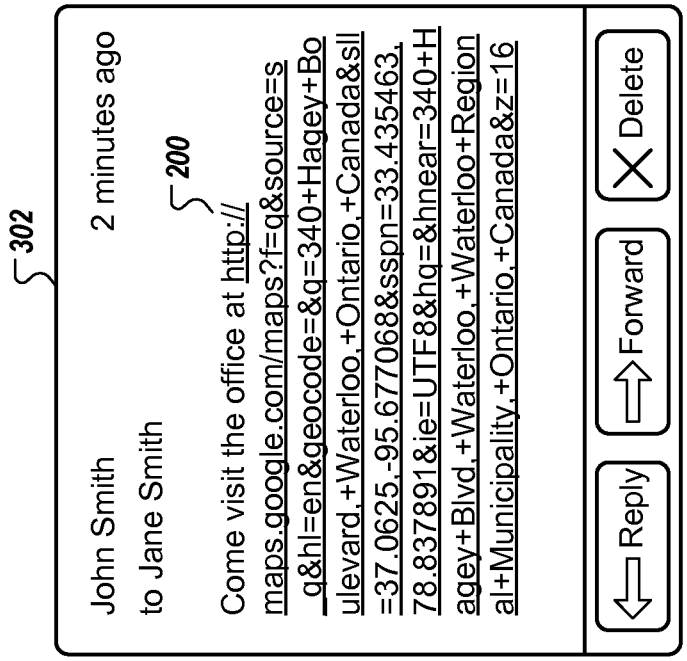

FIG. 3 is an example illustration demonstrating the use of a display name 310 to replace the map-host URL 200 as a hyperlink. In the example of FIG. 3, a first user, John Smith, using an electronic mail (email) application on a handheld computing device, composes an email to a second user, Jane Smith. For example, the handheld computing device can be a tablet computer, a mobile telephone, or a personal digital assistant (PDA). The handheld computing device includes a display that displays the email content (e.g., display screen shot 302) the first user enters the text for the email message using an input device (e.g., touch-screen, keyboard and/or a pointing device). The email includes the map-host URL 200, shown in FIG. 2, displaying the text for the URL. The example map-host URL 200 points to a web page that includes a map showing the location of an office. The map-host URL 200 is included in the body of the text of the email. As additional text is entered to the email, a short time later but before sending the email, the email application generates and displays the display name 310 shown in screen shot 308. The email application replaces the text for the map-host URL 200 with the display name 310 provided as a hyperlink anchored to the map-host URL 200. For example, referring again to FIG. 2, the email application can parse the query parameters 204 in the map-host URL 200 and identify parameters 204a-e for use as the display name 310. Additionally, the email application can format the parameters 204a-e in a way that is meaningful to the user (e.g., place a comma between the city 204d and the province 204e) when creating the display name 310.

In some implementations, the handheld computing device uses an application on a server that communicates with the handheld computing device. The server-based application can generate the display name 310 using the map-host URL 200. For example, the email application running on the handheld computing device can send the map-host URL 200 to a server hosting the server-based application. The handheld computing device and the server can communicate using a network. The server-based application can parse the query parameters 204 in the map-host URL 200 and identify parameters 204a-e for use as the display name 310. Additionally, the server-based application can format the parameters 204a-e in a way that is meaningful to the user when creating the display name 310. The server-based application can provide the display name 310 to the handheld computing device using the network. The email application can receive the display name 310 and display the display name 310 to the user in their email content as shown in screen shot 308.

Figure 4:
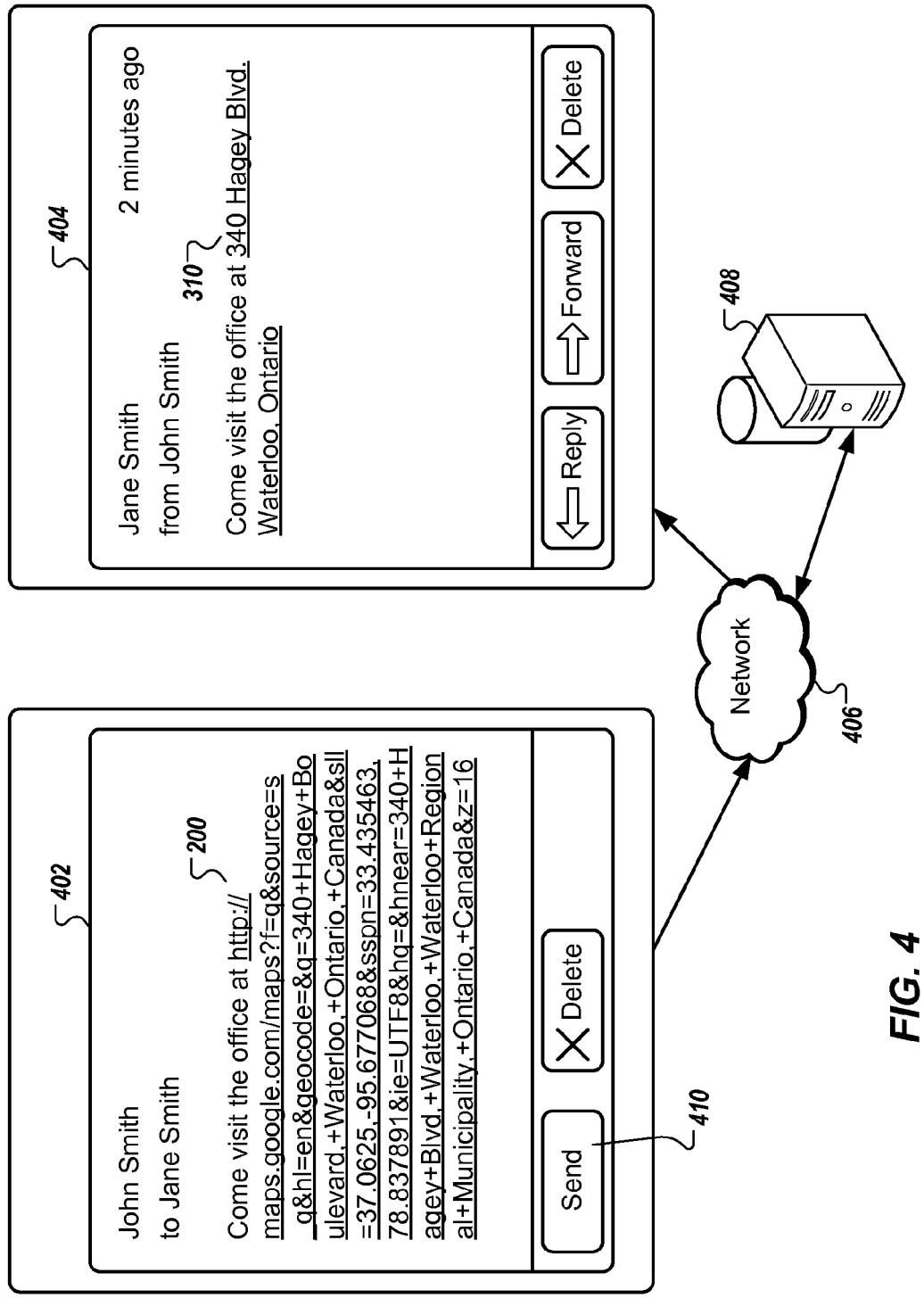
FIG. 4 is an alternative example illustration demonstrating the use of a display name to replace a map-host URL as a hyperlink on a web page.

FIG. 4 is an alternative example illustration demonstrating the use of the display name 310 to replace the map-host URL 200 as a hyperlink. In the example of FIG. 4, a first user, John Smith, using an email application on a handheld computing device, composes an email to a second user, Jane Smith. The handheld computing device includes a display that displays the email content to John (e.g., display screen shot 402) as he enters the text for the email message using a keyboard and a pointing device. The email includes the map-host URL 200, shown in FIG. 2, displaying the text for the URL. The map-host URL 200 points to a web page that includes a map showing the location of John's office. The map-host URL 200 is included in the body of the text of the email.

When John is finished composing the email to Jane, John activates a send button 410 to send the email to Jane. Prior to sending the email to Jane's handheld computing device, the email application can generate the display name 310 as previously described and replace the text for the map-host URL 200 with the display name 310 that is a hyperlink anchored to the map-host URL 200.

The email application on John's handheld computing device sends the email message to Jane's handheld device using network 406. Jane receives the email on her handheld computing device and views the content of the email on the display of her handheld computing device (e.g., display screen shot 404). Though the content of the email composed by John prior to sending included the text of the map-host URL 200, as shown in screen shot 402, the content of the email viewed by Jane upon receipt of the email from John includes the display name 310.

In some implementations, a handheld computing device uses an application on a server 408 that communicates with the handheld computing device. The server-based application can create the display name 310 using the map-host URL 200. For example, when John activates the send button 410, the email is sent from John's handheld computing device to the server 408 using the network 406. The server-based application can examine the email content, identify the map-host URL 200 and generate the display name 310, replacing the map-host URL 200 with the display name 310 in the email before sending the email to Jane's handheld computing device using the network 406.

In some implementations, an application running on a computing device (e.g., a handheld computing device or a server) can store a file that includes the original URL. For example, referring again to FIG. 4, an email application running on John's handheld computing device can store the email to Jane on John's computing device. Alternatively, the email application can store the email to Jane on the server 408. The stored email can include the original URL. When the stored email is displayed on Jane's computing device, the display name 310 can be displayed in the email, while the original URL is stored with the email at John's computing device or a server and remains unmodified.

In some implementations, a user (e.g., Jane) can have the ability to determine the use of the substitution of a display name for an original URL in an email message. For example, the user can select to turn the display name feature ON, substituting a display name for the original URL, or to turn the display name feature OFF, displaying the original URL. The underlying application (e.g., email application) can store original URLs. The application can process the original URL to generate a display name to display in place of the original URL when the user selects to turn the display name feature ON. For example, the user may turn the display name feature ON and subsequently all documents (e.g., emails) viewed, including previously stored documents, will substitute a display name for the original URL. The user may turn the display name feature OFF and subsequently all documents viewed, including previously stored documents that may have been viewed with substituted display names for the original URLs, will display the original URL. For example, a user can turn the display name feature ON when viewing email messages on a handheld computing device with a limited display screen viewing area. The user can turn the display name feature OFF when viewing email messages on a desktop computer, for example, that provides a larger display screen viewing area.

Although the examples of FIGS. 3 and 4 are provided in the example context of emails, it is appreciated that aspects provided herein can be implemented in other contexts. Other example contexts include instant messaging applications, word processing applications, spreadsheet applications, presentation applications. In short, aspects provided herein can be implemented in any application, by which a user inputs an original hyperlink for display, and the original hyperlink can be processed and replaced by a shorter, more informative hyperlink that points to the same resource as the original hyperlink.

In some implementations, whether an original hyperlink is processed to be replaced by a shorter, more informative hyperlink can be determined based on characteristics of the original hyperlink. In some implementations, a number of characters in the hyperlink text of the original hyperlink can be compared to a threshold number of characters. If the number of characters in the hyperlink text is less than the threshold number of characters, shortening of the original hyperlink may not be required. If the number of characters in the hyperlink text is not less than the threshold number of characters, shortening of the original hyperlink may be required. In some implementations, the hyperlink text of the original hyperlink can be processed to determine the presence of one or more pre-defined, or "special" characters (e.g., @, #, $, and the like). If one or more of the pre-defined characters is present, shortening of the original hyperlink may be required. In some implementations, the hyperlink text of the original hyperlink can be processed to determine the presence of strings of characters (e.g., a string including two or more characters) that contain non-sensical terms (e.g., long, random character sequences and/or number strings). If strings of characters that contain non-sensical terms are present in the hyperlink text, shortening of the original hyperlink may be required.

In some implementations, shortening of the original hyperlink can be achieved based on a contact directory lookup. For example, an address corresponding to a maps link within an email text can be used as a look-up to a contacts directory. The shortened hyperlink text can be generated to include a contact name and/or other relevant information corresponding to a particular contact.

Figure 5:
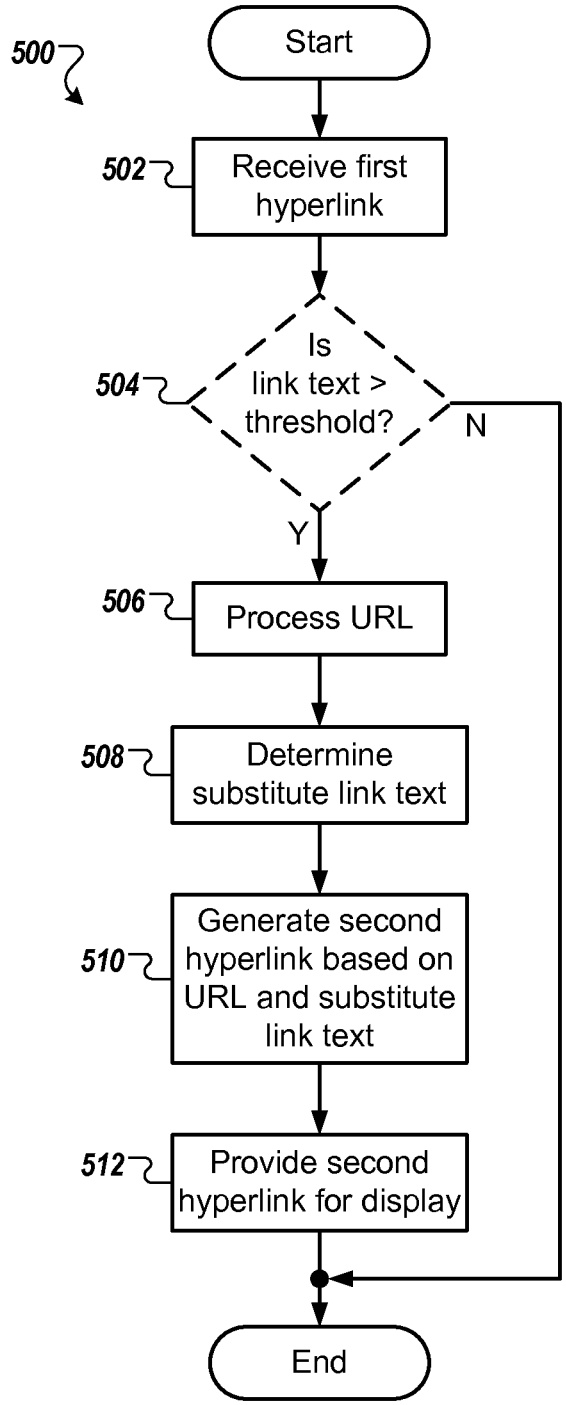
FIG. 5 is a flowchart of an exemplary process for generating a display name.

FIG. 5 is a flowchart of an example process 500 for generating a display name. The process 500 can be used to generate and display a display name as described with reference to FIGS. 1-4. The process 500 can be provided as an application executed using one or more processors of one or more computing devices.

The process 500 begins by receiving a first hyperlink (502). For example, the first hyperlink can be received as input to a computing device. As previously described, the first hyperlink can be a URL where the URL string is displayed to a user as the hyperlink text. As an option, the number of characters in the hyperlink text can be compared to a threshold number of characters (504). If the number of characters in the hyperlink text is less than the threshold number of characters, the process 500 ends. In this optional case, the URL string is deemed to be sufficiently short and is used as the hyperlink text. In some implementations, the threshold number of characters is determined based on the number of characters a hyperlink can include without becoming too large. For example, a large hyperlink can interfere with a user's viewing of user content on the display of a handheld computing device. In some implementations, other methods of determining whether the first hyperlink is processed to be replaced by a shorter, more informative hyperlink can be determined based on characteristics of the first hyperlink, as discussed above.

If the number of characters in the hyperlink text is greater than the threshold number of characters, the URL is processed to generate substitute link text (506). Processing of the URL to generate a display name with fewer characters than the URL string is described in further detail above with reference to FIGS. 1-4. Processing of the URL is performed to reduce the number of characters in the hyperlink. Substitute link text is determined (508). The substitute link text can be used as a display name for a second hyperlink. Specifically, the second hyperlink is generated based on the URL and the substitute link text (510). The second hyperlink can include the original URL anchored to the display name provided by the substitute link text. The second hyperlink is provided for display (512). In some implementations, the second hyperlink can be provided to a client-side computing device from a server-side computing device for display on the client-side computing device. For example, referring to FIG. 4, the email message received by Jane from John displays the display name 310. As described with reference to FIGS. 1-3, the display name 310 is a hyperlink that uses the map-host URL 200 to navigate to a web page that is a map showing the location of 340 Hagey Boulevard, in Waterloo, Ontario. The display name can be included in element 10 at link text 14 along with the map-host URL 200 at URL 12.

Figure 6:
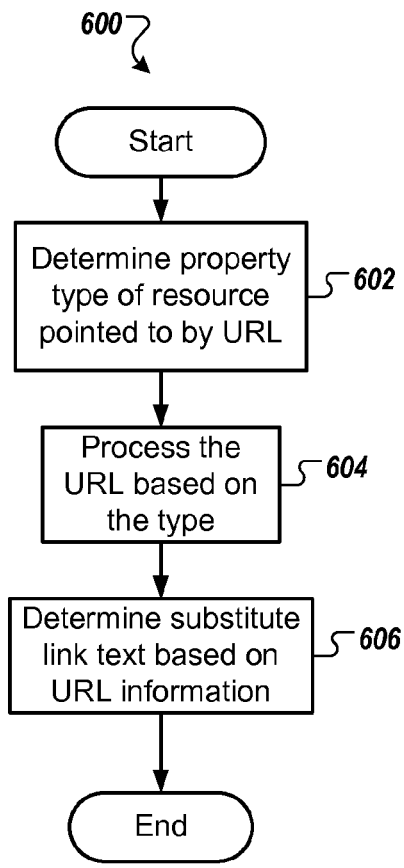
FIG. 6 is a flowchart of an exemplary process for using a URL to determine substitute link text.

FIG. 6 is a flowchart of an example process 600 for using a URL to determine substitute link text. The process 600 can be used to generate a display name as described with reference to FIGS. 1-4. The process 600 can be provided as an application executed using one or more processors of one or more computing devices.

The process 600 starts by determining the property type of the resource pointed to by the URL (602). For example, an application running on a computing device (e.g., a handheld computing device or a server) can examine the resource pointed to by a URL and determine a property type (e.g., a mapping property) of the resource. The URL can be processed based on the property type (604). The substitute link text can be determined based on the URL information (606). For example, the application can examine query parameters in the URL and determine which query parameters provide meaningful information for inclusion in the substitute link text. The application can use the substitute link text to create a display name for a hyper link that includes information that is meaningful to the user about the resource pointed to by the URL.

Figure 7:
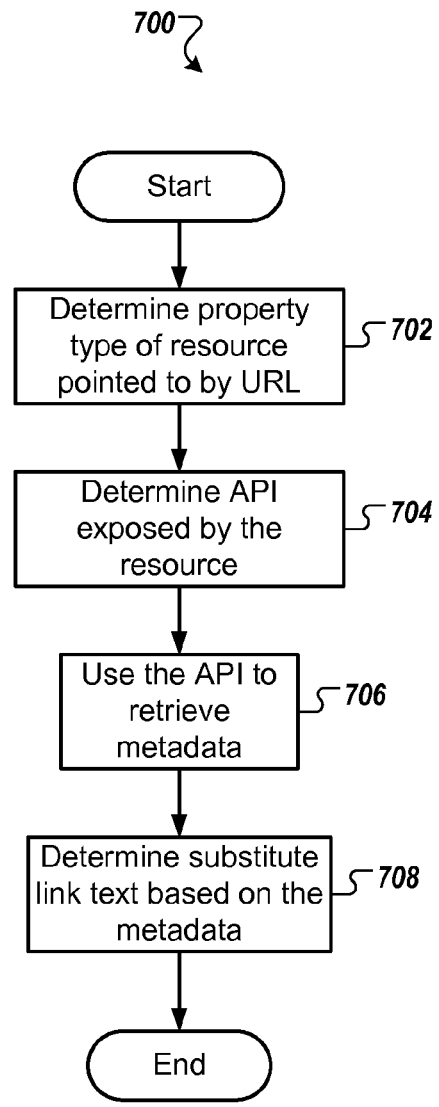
FIG. 7 is a flowchart of an alternative exemplary process for using a URL to determine substitute link text.

FIG. 7 is a flowchart of an alternative example process 700 for using a URL to determine substitute link text. The process 700 can be used to generate a display name as described with reference to FIGS. 1-4. The process 700 can be provided as an application executed using one or more processors of one or more computing devices.

The process 700 begins by determining the property type of the resource pointed to by the URL (702). For example, an application running on a computing device (e.g., a handheld computing device or a server) can examine the resource pointed to by a URL and determine a property type (e.g., a video property) of the resource. An API exposed by the resource is determined (704). For example, the application can use the API exposed by the resource to assist in creating a display name. The API is used to retrieve metadata (706). For example, the URL can include a query parameter (e.g., a numerical identifier for a specific video) that, when used with the API, retrieves metadata about the resource. Substitute link text can be determined using the metadata (708). For example, the application can extract information for the substitute link text that is meaningful to a user from the metadata (e.g., the title of the video). The application can use the substitute link text to create a display name for the second hyperlink that includes information meaningful to the user about the resource pointed to by the URL.

Figure 8:
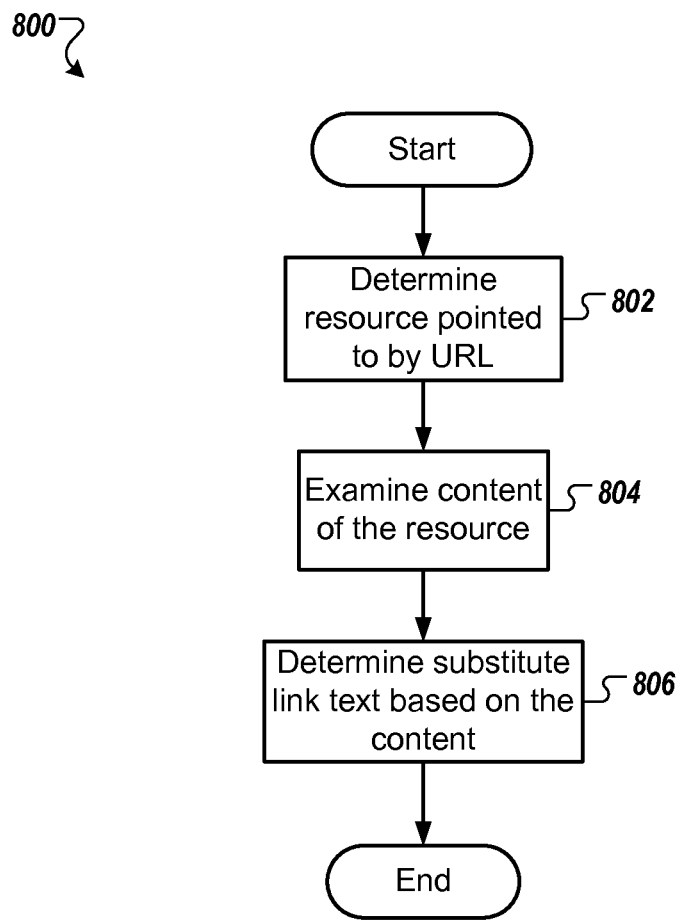
FIG. 8 is a flowchart of another example process for using a URL to determine substitute link text.

FIG. 8 is a flowchart of another example process 800 for using a URL to determine substitute link text. The process 800 can be used to generate a display name as described with reference to FIGS. 1-4. The process 800 can be provided as an application executed using one or more processors of one or more computing devices.

The process 800 begins by determining the resource pointed to by the URL (802). The content of the resource is examined (804). For example, an application running on a computing device (e.g., a handheld computing device or a server) can examine the resource pointed to by a URL and determine information related to content of the resource (e.g., the title of a web page). Substitute link text can be determined based on the content of the resource (806). For example, the application can determine the title of the web page, which may provide information that is meaningful to a user. The application can use the content (e.g., web page title) as the substitute link text. The application can use the substitute link text to create a display name for the second hyperlink.

In some implementations, an application can perform process 600, process 700 and process 800 sequentially in order to determine substitute link text. For example, the application may perform process 600, but the results do not produce any meaningful text for display to a user. The application may next perform process 700. When attempting to perform process 700, the application may determine that the resource pointed to by the URL does not expose any APIs. In such a case, no APIs are provided to enable the application to retrieve metadata related to the resource. The application may then perform process 800. Using process 800, the application can examine the actual content at the resource pointed to by the URL in order to gather meaningful information to display to a user and include such information as the substitute link text.

In some implementations, a hyperlink is renamed automatically to the name of the author of the web page whose URL is anchored to the hyperlink. The automatic renaming of the hyperlink can occur once the author enters their name as the author of the web page. The automatic renaming of the hyperlink eliminates the need for the web page author to enter manually his or her name as the display name for the web page link.

In some implementations, an intermediate URL can be generated that is a shortened version of a longer URL. The intermediate URL can point to a resource that includes the original URL. The redirection can allow the intermediate, shortened URL to be displayed to the user as a hyperlink with the intermediate URL anchored to the hyperlink. For example, when a user activates the hyperlink, the intermediate URL points to the location of the original URL. The original URL points the location of a resource. This level of redirection can result in the intermediate URL pointing to a malicious resource. Due to the level of indirection, the user may be unaware that the intermediate resource is malicious as the user only sees the intermediate URL (e.g., the user hovers over the hyperlink (which is anchored to the intermediate URL) and the intermediate URL is displayed). Therefore, the intermediate URL can point to a malicious web page on a malicious web site. A bad web sites directory can flag potential dangerous intermediate URLs preventing user access to malicious web sites.

In some implementations, an application can rename an intermediate URL by retrieving the name of the resource pointed to by the original URL. The application can use the resource name to generate an informative hyperlink anchored to the intermediate URL. In some implementations, an application can use the intermediate URL to retrieve the original URL. The application can process the original URL, using the processes described with respect to FIGS. 5-8, to determine substitute link text for use as a display name for a hyperlink. The application can anchor the original URL to the hyperlink to eliminate the need for the use of an intermediate URL, reducing the potential for malicious tampering of the URLs due to the added level of redirection.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be realized in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations of the present disclosure have been described. Other implementations are within the scope of the following claims. For example, the actions recited in the claims can be performed in a different order and still achieve desirable results.

What is claimed is:

1. A computer-implemented method comprising:
receiving a uniform resource identifier that (i) specifies query parameters, and (ii) identifies a particular resource;
determining a number of characters of link text of the uniform resource identifier;
comparing the number of characters of the link text of the uniform resource identifier to a threshold number of characters;
based at least on determining that the number of characters of the link text of the uniform resource identifier exceeds the threshold number of characters, determining a resource type associated with the particular resource identified by the uniform resource identifier, wherein the resource type associated with the particular resource identified by the uniform resource identifier includes a resource type from the group consisting of an HTML page, a data file, a server, an image file, a sound file, and a video file;
selecting a subset of the query parameters specified in the uniform resource identifier based on the resource type associated with the particular resource identified by the uniform resource identifier;
generating a hyperlink that (i) references the same uniform resource identifier, and (ii) includes the subset of the query parameters specified in the uniform resource identifier as link text; and
providing the hyperlink for output.

2. The method of claim 1, wherein the query parameters specified in the uniform resource identifier comprise one or more text segments of the link text of the uniform resource identifier, and wherein selecting the subset of the query parameters specified in the uniform resource identifier comprises selecting a portion of the one or more text segments of the link text of the uniform resource identifier.

3. The method of claim 1, comprising:
accessing metadata based on the uniform resource identifier; and
generating a hyperlink that (i) references the same uniform resource identifier, and that (ii) is based at least in part on the metadata.

4. The method of claim 1, comprising:
accessing content provided at the particular resource identified by the uniform resource identifier; and
generating a hyperlink that (i) references the same uniform resource identifier, and that (ii) is based at least in part on the content provided at the particular resource identified by the uniform resource identifier.

5. The method of claim 1, comprising providing the uniform resource identifier for output; and
wherein providing the hyperlink for output comprises substituting the hyperlink for the uniform resource identifier provided for output.

6. The method of claim 1, comprising:
processing an application program interface (API) for determining the subset of the query parameters specified in the uniform resource identifier, wherein the API is exposed by the particular resource identified by the uniform resource identifier.

7. The method of claim 6, wherein processing the API comprises retrieving metadata using the API and at least a portion of the link text of the uniform resource identifier, and wherein the subset of the query parameters specified in the uniform resource identifier is selected based at least in part on the metadata.

8. The method of claim 1, wherein the uniform resource identifier that (i) specifies query parameters, and (ii) identifies the particular resource is received based on user input to an electronic document.

9. The method of claim 1, comprising:
determining that the link text of the uniform resource identifier includes one or more predefined characters, and
wherein generating the hyperlink and providing the hyperlink for output are only executed in response to determining that the link text of the uniform resource identifier includes the one or more predefined characters.

10. The method of claim 1, comprising:
determining that the link text of the uniform resource identifier includes a character sequence that is characterized as random; and
wherein generating the hyperlink and providing the hyperlink for output are only executed in response to determining that the link text of the uniform resource identifier includes a character sequence that is characterized as random.

11. The method of claim 1, comprising:
identifying a contact based on the link text of the uniform resource identifier; and
determining information related to the contact using a contact list, wherein the hyperlink includes the information related to the contact.

12. The method of claim 1, comprising:
parsing the query parameters specified in the uniform resource identifier; and
selecting the subset of the query parameters specified in the uniform resource identifier based at least on parsing the query parameters specified in the uniform resource identifier.

13. The method of claim 12, comprising:
generating the hyperlink based at least on parsing the query parameters specified in the uniform resource identifier.

14. The method of claim 1, wherein the hyperlink is anchored to the uniform resource identifier.

15. A system comprising:
a processor configured to executed computer program instructions; and
a computer storage medium encoded with computer program instructions that, when executed by the processor, cause the system to perform operations comprising:
- receiving a uniform resource identifier that (i) specifies query parameters, and (ii) identifies a particular resource;
- determining a number of characters of link text of the uniform resource identifier;
- comparing the number of characters of the link text of the uniform resource identifier to a threshold number of characters;
- based at least on determining that the number of characters of the link text of the uniform resource identifier exceeds the threshold number of characters, determining a resource type associated with the particular resource identified by the uniform resource identifier, wherein the resource type associated with the particular resource identified by the uniform resource identifier includes a resource type from the group consisting of an HTML page, a data file, a server, an image file, a sound file, and a video file;
- selecting a subset of the query parameters specified in the uniform resource identifier based on the resource type associated with the particular resource identified by the uniform resource identifier;
- generating a hyperlink that (i) references the same uniform resource identifier, and (ii) includes the subset of the query parameters specified in the uniform resource identifier as link text; and
- providing the hyperlink for output.

16. A computer-readable storage device encoded with a computer program, the program comprising instructions that, if executed by one or more computers, cause the one or more computers to perform operations comprising:
- receiving a uniform resource identifier that (i) specifies query parameters, and (ii) identifies a particular resource;
- determining a number of characters of link text of the uniform resource identifier;
- comparing the number of characters of the link text of the uniform resource identifier to a threshold number of characters;
- based at least on determining that the number of characters of the link text of the uniform resource identifier exceeds the threshold number of characters, determining a resource type associated with the particular resource identified by the uniform resource identifier, wherein the resource type associated with the particular resource identified by the uniform resource identifier includes a resource type from the group consisting of an HTML page, a data file, a server, an image file, a sound file, and a video file;
- selecting a subset of the query parameters specified in the uniform resource identifier based on the resource type associated with the particular resource identified by the uniform resource identifier;
- generating a hyperlink that (i) references the same uniform resource identifier, and (ii) includes the subset of the query parameters specified in the uniform resource identifier as link text; and
- providing the hyperlink for output.

* * * * *